(12) United States Patent
Lavretsky et al.

(10) Patent No.: US 8,185,255 B2
(45) Date of Patent: May 22, 2012

(54) ROBUST CONTROL EFFECTOR ALLOCATION

(75) Inventors: Eugene Lavretsky, Los Angeles, CA (US); Ryan D. Diecker, Freeburg, IL (US); Joseph S. Brinker, Highland, IL (US)

(73) Assignee: The Boeing Company, Chicago, IL (US)

( * ) Notice: Subject to any disclaimer, the term of this patent is extended or adjusted under 35 U.S.C. 154(b) by 1208 days.

(21) Appl. No.: 11/948,611

(22) Filed: Nov. 30, 2007

(65) Prior Publication Data

US 2009/0143925 A1 Jun. 4, 2009

(51) Int. Cl.
*G05D 1/08* (2006.01)
*G05D 3/12* (2006.01)

(52) U.S. Cl. .................. 701/3; 701/48; 700/28; 700/29; 244/75.1

(58) Field of Classification Search ............ 701/1, 3–18, 701/36, 41, 42, 48; 700/44, 45, 28, 29; 703/8; 244/75.1
See application file for complete search history.

(56) References Cited

U.S. PATENT DOCUMENTS

| | | | |
|---|---|---|---|
| 4,980,835 A | | 12/1990 | Lawrence et al. |
| 5,347,446 A | * | 9/1994 | Iino et al. .................. 700/29 |
| 5,908,176 A | | 6/1999 | Gilyard |
| 6,278,901 B1 | | 8/2001 | Winner et al. |
| 6,278,908 B1 | | 8/2001 | Durham |
| 6,341,247 B1 | | 1/2002 | Hreha et al. |
| 6,431,494 B1 | * | 8/2002 | Kinkead et al. ............. 244/76 B |
| 6,591,169 B2 | | 7/2003 | Jones et al. |
| 6,711,476 B2 | | 3/2004 | Jones et al. |
| 6,814,330 B2 | | 11/2004 | Jones et al. |
| 7,255,306 B2 | | 8/2007 | Jones et al. |
| 2004/0162865 A1 | | 8/2004 | Meinds |
| 2007/0106432 A1 | | 5/2007 | Jones et al. |

FOREIGN PATENT DOCUMENTS

WO 03/027789 A1 4/2003

OTHER PUBLICATIONS

Kim et al, "Nonlinear Model Predictive Tracking Control for Rotorcraft-based Unmanned Aerial Vehicles", May 2002, Proceedings of the American Control Conference, pp. 3576-3581.*
European Patent Office, European Search Report dated Jun. 21, 2010.
Hovakimyan, Naira, et al., "Dynamic Inversion for Nonaffine-in-Control Systems via Time-Scale Separation: Part I", 2005 American Control Conference, pp. 3542-3547, Jun. 8-10, 2005. Portland, OR, USA.
Lavretsky, Eugene, et al., "Adaptive Dynamic Inversion for Nonaffine-in-Control Systems via Time-Scale Separation: Part II", 2005 American Control Conference, pp. 3548-3553, Jun. 8-10, 2005. Portland, OR, USA.
Oppenheimer, Michael W., et al., "A Method for Including Control Effector Interactions in the Control Allocation", AIAA Guidance, Navigation and Control Conference and Exhibit, pp. 1-10, Aug. 20-23, 2007, Hilton Head, South Carolina.

* cited by examiner

*Primary Examiner* — Khoi Tran
*Assistant Examiner* — Spencer Patton
(74) *Attorney, Agent, or Firm* — Moore & Van Allen PLLC (57) ABSTRACT

Method and apparatus is disclosed which allocates the execution of a commanded vehicle maneuver among the vehicle's control effectors capable of affecting such maneuver, with consideration given to the possible nonlinear and/or non-monotonic effects each control effector's displacement may have on the vehicle and on each other's performance.

24 Claims, 4 Drawing Sheets

FIG. 1

$$\dot{u}_{cmd} = K * (m_{cmd} - b * u_{cmd}) \quad \text{Eq. 1}$$

$$u_{cmd} = \frac{K}{S + b*K} * m_{cmd} \leq \frac{K}{S} * m_{cmd} \quad \text{Eq. 2}$$

ROBUST CONTROL EFFECTOR ALLOCATION

GOVERNMENT INTERESTS

This invention was made with Government support under MDA972-99-9-0003 awarded by DARPA. The theoretical foundations of this invention were partially funded by AFOSR grant number FA9550-04-C-0047. The government has certain rights in this invention.

BACKGROUND OF THE INVENTION

The present invention relates to the real time allocation of control authority among the control effectors of a controllable vehicle in executing a commanded maneuver, such allocation being made in consideration of the possible nonlinear and non-monotonic effects the displacement of those control effectors may produce on the vehicle and on each other in affecting such maneuver. The invention is explained in terms of its application to aircraft; however, the invention is equally applicable to any air, space, sea, under-sea, or ground vehicle, whose dynamics are controllable via selected set of control effectors.

The in-flight control and maneuvering of aerodynamic vehicles, such as aircraft, are accomplished by positioning the aircraft's control surfaces to modify the airflow across them to affect an aerodynamic response from the aircraft. The control surfaces, along with other force and moment producing devices such as thrust vectoring, are referred to as "control effectors" The control effectors are position controlled by the aircraft's flight control system in response to pilot (or autopilot) commands to maintain or alter the aircraft's position using roll, pitch and yaw maneuvers, or direct force such as direct lift. With legacy aircraft, the principal control surfaces are the ailerons (roll), elevators (pitch), and rudders (yaw).

Today, however, with the evolution of aircraft design to include tailless airplanes, such as the delta wing fighter plane with its requirement for high agility and low profile that limits vertical control surfaces, advanced control concepts are required to replace the vertical tail and rudder control surfaces. New aircraft designs, whether necessary to meet military requirements or to achieve improved fuel efficiencies for commercial and private aircraft, have included an increased number of control effectors. The increased number provides both redundancy for flight safety in the event of a control effector failure, as well as offering the aircraft flight control system a greater suite of effectors that may be used collectively to optimize the vehicle's aerodynamic performance and stability. Advanced control laws are then required to utilize this larger control effector suite to maximize the performance capabilities of the vehicle.

The control effectors are each driven by their associated actuator, or by pairs of actuators when redundancy is required for fail safe operation. The effectors are positioned and repositioned as necessary to supplement or supplant the aerodynamic affects produced by the legacy control surfaces to achieve the commanded flight maneuver or condition. With differences in the aerodynamics required by different maneuvers and the different effects that each control effector is designed to produce, the flight control system must allocate execution of the commanded maneuver among several control effectors. The allocation is determined by the type of commanded action, the current flight conditions, and the known response characteristics of the aircraft. The flight control system determines the control actions, i.e. the forces, moments, rotational accelerations, and/or linear accelerations required from the control effector suite in each of the vehicle's control axes to execute a given maneuver. These forces, moments, rotational accelerations, and/or linear accelerations define reference commands to the control allocation algorithm which determines the individual control effector commands required for the control effector suite to produce responses that track the reference commands.

Each control effector's authority in executing the command is then determined using a control allocation algorithm, and the effector is held in its commanded position through set point control of its actuator(s). The prior art flight control systems, however, use control allocation algorithms which assume linearity of the control effector effects and use techniques, such as a pseudo-inverse to generate the actuator commands. This does not account for the possibility of interactions between control effectors whose response is nonlinear, and which may exhibit significant interactions between them. Those known control methods which do assume control effector nonlinear and non-monotonic interactions use iterative techniques, such as linear programming to account for these interactions. These iterative solution techniques make them undesirable for embedded software applications.

BRIEF SUMMARY OF THE INVENTION

In accordance with an embodiment of the present invention, a method is presented for allocating control of a commanded vehicle maneuver among the vehicle's control effectors. The method does this by first predicting the vehicle linear and/or angular accelerations in response to the control effectors and the commanded maneuver, and then modifying the control command as necessary to accommodate for any nonlinear and/or non-monotonic effects the effector displacements may produce on the vehicle and or on each other's performance.

The present control allocation method does this with a multi-input-multi-output function $g(x,u)$ that represents the vehicle nonlinear database. The method characterizes the vehicle dynamics and the characteristics of the various control effectors, and then analyzes $g(x,u)$ function to define virtual control effectors that make the desired control responses (e.g. moments or rotational accelerations) monotonic (i.e. entirely nonincreasing or nondecreasing).

The present invention is based on formal methods in dynamics and control. The method is applicable to controllable vehicles with control effectors whose effectiveness might be nonlinear with control deflections and the states of the vehicle. The method assumes that the vehicle's dynamics are controllable via the control effectors. The method also assumes that all states of the vehicle are available on-line through a suite of sensors or via estimates. The method does not require iterative solution techniques. In addition, it limits the gain of the control allocation scheme at frequencies below a specified frequency to prevent amplification of structural mode characteristics.

In accordance with another embodiment of the present invention, a vehicle control system which performs real time allocation of control authority among the vehicle control effectors for performance of a commanded vehicle maneuver, the control system having control logic circuitry for formulating reference command signals which specify the control actions to be performed in each vehicle control axes in execution of the commanded maneuver, and having a control computer for executing a control allocation algorithm to provide the actual control effector command signals to the vehicle control effectors to affect the real time allocation of control authority among those vehicle control effectors capable of producing the necessary control actions in the required vehicle control axes in satisfaction of the reference command signal, with consideration given in such control allocation to the possible nonlinear and/or non-monotonic effects each performing control effectors may have on the vehicle and on each other.

In accordance with another embodiment of the present invention, an unmanned aircraft which is commanded by on-board or ground based flight control systems includes a fuselage and wings attached to the fuselage, and a vehicle control system as described in the immediately preceding paragraph. In addition, the aircraft fuselage may also include a cockpit for piloted aircraft.

In accordance with another embodiment of the present invention, a control allocation algorithm computer program product provides a computer usable medium having computer usable program code embodied therewith which provides, in its execution, in response to received reference command signals that identify the vehicle actions to be performed and the vehicle control axes in which those actions must be performed for vehicle execution of the commanded maneuver, the actual control effector command signals that allocate control authority among those vehicle control effectors capable of producing the necessary control actions in the required vehicle control axes in satisfaction of the reference command signal, with consideration given in such control allocation to the possible nonlinear and/or non-monotonic effects each of the performing control effectors may have on the vehicle and on each other.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, portions of the present invention may take the form of an entirely hardware embodiment, an entirely software embodiment (including firmware, resident software, micro-code, etc.) or an embodiment combining software and hardware aspects that may all generally be referred to herein as a "circuit," "module," "unit," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a tangible medium such as a portable computer diskette, a hard disk, a random access memory (RAM), a read-only memory (ROM), an erasable programmable read-only memory (EPROM or Flash memory), an optical fiber, a portable compact disc read-only memory (CD-ROM), or other tangible optical or magnetic storage devices; or transmission media such as those supporting the Internet or an intranet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present control allocation method is capable of real time allocation of control of pilot or auto-pilot flight commands among the aircraft's control effector actuators despite the possible nonlinear and, or non-monotonic effects the control effector displacements may have on the aircraft and on each other. Consider the nonlinear mapping between the control response (e.g. force, moment, rotational accelerations and/or linear acceleration commands) and the control effector positions.

$$r=g(x,u)$$

r: p×1 is the control command vector
x: n×1 is the vehicle state vector
u: m×1 is the control effector position vector; and $$g = \begin{bmatrix} g_1(x, u) \\ \vdots \\ g_p(x, u) \end{bmatrix} : p \times 1 \text{ is the vector of the nonlinear response}$$

to the control effector position

The present invention identifies a set of control effector position commands, $u_c$, that provide a corresponding set of commanded control actions, $r_c$, where: $r_c = g(x, u_c)$. When the commanded controlled actions produce nonlinear and/or non-monotonic effects, or where their control power characteristics interact with other effectors, an explicit or analytical inversion of the g(x,u) function may not be possible.

The present invention overcomes this control allocation problem by using as its foundation a dynamic inversion control law for nonaffine-in-control dynamic systems that was earlier developed by Naira Hovakimyan, Eugene Lavretsky, and Amol J. Sasane[1]. This dynamic inversion control law formulates a solution to the nonlinear and/or non-monotonic problem by using an approximate dynamic inversion based on time-scale separation principles. It does this by requiring the number of control effectors (m) to equal the number of control commands (p), or p=m. However, many aerodynamic vehicle platforms have redundant control effectors, so that m>p for these vehicles.

[1] *Dynamic Inversion for Nonaffine-in-Control Systems via Time-Scale Separation*: Part I; Naira Hovakimyan, Eugene Lavretsky, and Amol J. Sasane; 2005 American Control Conference, Jun. 8-10, 2005, Portland, Oreg. and *Dynamic inversion for Nonaffine-in-Control Systems via Time-Scale Separation*: Part II; Naira Hovakimyan and Eugene Lavretsky; 2005 American Control Conference, Jun. 8-10, 2005, Portland, Oreg.

The present invention uses the concept of "virtual control effectors" to cast the control allocation problem into a framework consistent with the theoretical foundation of the dynamic inversion control law using time-scale separation principle. These virtual control effectors are selected such that they become directly related to the vehicle's actual control effectors through a nonlinear function:

$$u = \rho(u')$$

u': p×1 vector of virtual control effectors
This function defines the position commands of the actual effectors based on the position commands of the virtual control effectors. The control allocation problem then reduces to finding $u_c'$ (and thus $u_c$) that yield a commanded set of control actions, $r_c$, related through the following nonlinear system of p equations with respect to p unknown functions u'.

$$r=g(x,\rho(u')).$$

The other requirements necessary for using the dynamic inversion control law of Hovakimyan/Lavretsky to control vehicle platforms having a greater number of control effectors than control commands i.e. (m>p) include:

1. $\dfrac{\partial g_i(x, \rho(u'))}{\partial u_i'} \neq 0$ for $i = 1 \ldots p$; and 2. Unique ideal dynamic inversion solution $(u')_{DI}^*$ exists, which implies that $g_i(x,\rho(u'))$ is monotonic with $u'_i$. These conditions can be satisfied with the appropriate choice of the virtual control effectors.

The solution to the control allocation problem can be formed as:

$$\varepsilon \dot{u}'_c = \begin{bmatrix} -\text{sign}\left(\dfrac{\partial g_1(x, \rho(u'))}{\partial u'_1}\right) & & \\ & \ddots & \\ & & -\text{sign}\left(\dfrac{\partial g_p(x, \rho(u'))}{\partial u'_p}\right) \end{bmatrix}$$

$$(g(x, \rho(u'_c)) - r_c)$$

$$= \begin{bmatrix} \text{sign}\left(\dfrac{\partial g_1(x, \rho(u'))}{\partial u'_1}\right) & & \\ & \ddots & \\ & & \text{sign}\left(\dfrac{\partial g_p(x, \rho(u'))}{\partial u'_p}\right) \end{bmatrix}$$

$$(r_c - g(x, \rho(u'_c)))$$

This guarantees convergence to within a small error of the ideal dynamic inversion solution based on the Tikhonov Theorem from singular perturbation theory[2]. Using the latter, the convergence rate is:

$$u_c' = (u_c')_{DI}^* + O(\varepsilon) \text{ as } t \to \infty$$

This rate of convergence is controlled by selection of the positive parameter ε, which must be chosen as a small enough value to make the dynamics of the control allocation solution "fast" with respect to those of the vehicle being controlled. A unique value of ε can be employed for each virtual control effector.

[2] H. K. Khalil. *Nonlinear Systems*. Prentice Hall, 2002.

Figure 1:
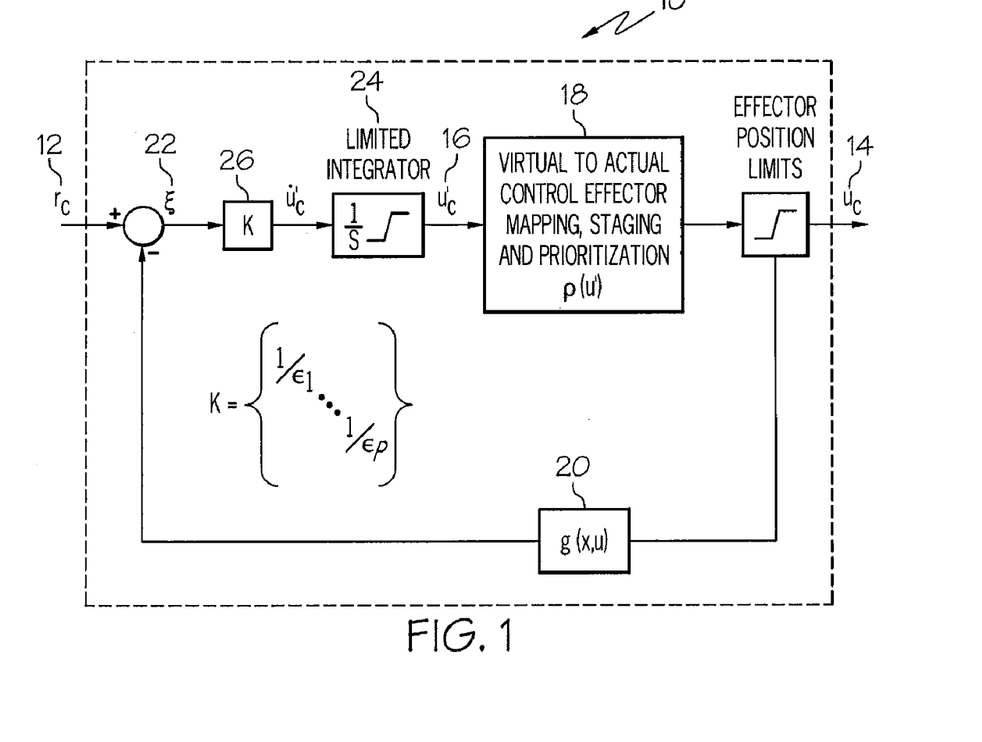
FIG. 1, is an illustration of the mathematical model of the real time control allocation algorithm of the present invention.

Referring now to FIG. 1, which illustrates the mathematical model 10 of the present control allocation method algorithm. The mathematical model 10 is intended to provide teaching of the steps performed by the method to those skilled in the art. In practice, execution of the program and the performance of the method is accomplished in a programmed computer. The method's algorithm is embodied in a computer program listing which identifies the method steps to be performed. The program listing may be in the form of electronic program signals that are stored in a physical memory medium. The memory medium may be of any suitable type or construction, whether volatile or non-volatile, and whether mounted within a computer or in a transportable form of signal storage media that may be used with a computer, as known to those skilled in the art.

The model 10 receives from the flight control logic circuitry, the reference commands ($r_c$) 12 which specify the control actions (e.g. force, moment, linear acceleration and/or rotational acceleration) for the vehicle's control axes (e.g. roll, pitch, and yaw axes for an aircraft) to produce the actual control effector commands ($u_c$) 14 that are presented to the control effector actuators. The roll, pitch, and yaw flight control logic circuitry formulates the reference command in response to pilot or auto-pilot commands and based on the vehicle's control laws. The control laws in turn respond to the sensed flight data that is fed back to the logic circuitry, to then control the vehicle's rotational rates, angle of attack/angle of sideslip, and/or linear accelerations, by generating reference commands $r_c$ to the control allocation algorithm in the vehicle's control axes.

The control allocation algorithm generates virtual control effector commands ($u_c'$) 16 that are transformed by the Virtual to Actual Control Effector Mapping 18 to produce the actual control effector commands ($u_c$) 14. The $g(x,u)$ transform 20 predicts the resulting response in the vehicle's control axes generated by the $u_c$, and the virtual control effector commands $u_c'$ 16 are generated by integrating the scaled errors ($\xi$) 22 between the reference commands $r_c$ and responses predicted by $g(x,u)$.

The Virtual to Actual Control Effector Mapping 18 allows the control system designer to stage and prioritize the use of the vehicle's control effectors, as well as to prioritize the roll, pitch and yaw elements of the reference command $r_c$ when all elements can not be satisfied simultaneously. This mapping defines the position command for each actual control effector based on the position commands of the virtual control effectors. Staging of the control effectors is achieved by using only a subset of the actual control effectors (remaining control effectors are commanded to their trim or neutral positions) to satisfy the virtual control effector commands when those commands are small. Additional actual control effectors are phased in when the virtual control effector commands exceed a level established by the designer. The axis prioritization can be mechanized by managing the limits of the integrator 24 of each virtual control effector, thus combining these functions with integrator anti-windup protection. The integrator limits must account for the position limits of the individual control effectors, and the control available for a given virtual effector given the priorization of shared control effectors. Position limits can be defined on an incremental basis to account for the rate capability of each control effector.

The selection of the gain K 26 determines the bandwidth of the control allocation scheme in a given axis. This is best illustrated through the use of the linear integrator 28 of FIG. 2, with its control allocation tracking loop 29. Effectively, the nonaffine control allocation scheme of the present control allocation method exhibits a first order tracking loop characteristics, where the low frequency gain is 1/b for low frequencies. This is the same as traditional control allocation schemes that directly invert the control effectiveness function. The gain rolls off at high frequencies.

Figure 2:
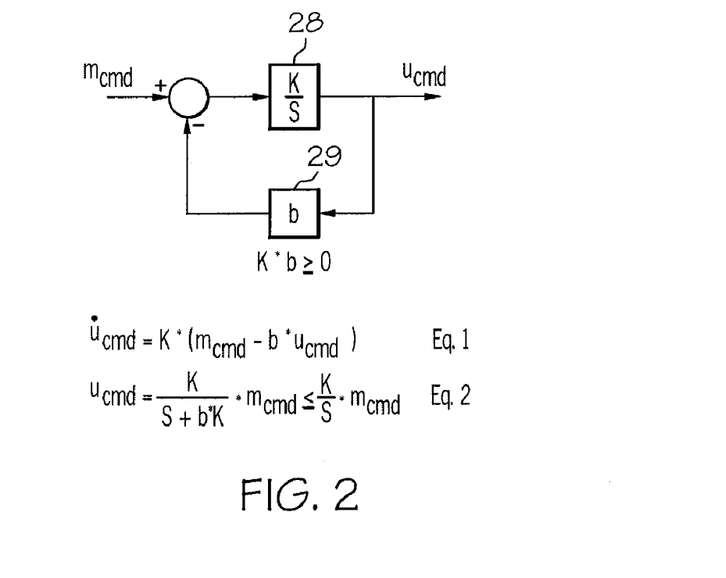
FIG. 2, is a schematic diagram of simple closed loop control system used in the teaching the control allocation mathematical model of FIG. 1.

The break frequency of the nonaffine control allocation scheme is determined by the gain K and the control power derivative (slope of the control effectiveness versus deflection curve) at the current operating point. The 0 dB gain crossing is directly determined by the gain K, which allows the control system designer to band-limit the gain of the control allocation scheme and avoid amplification of the vehicle's high frequency dynamics, such as structural modes. The gain K must be selected high enough to make the control allocation dynamics faster than those of the main control loop, but low enough that the resulting control allocation loop dynamics can be implemented at the selected digital control system sample rate.

Figure 3:
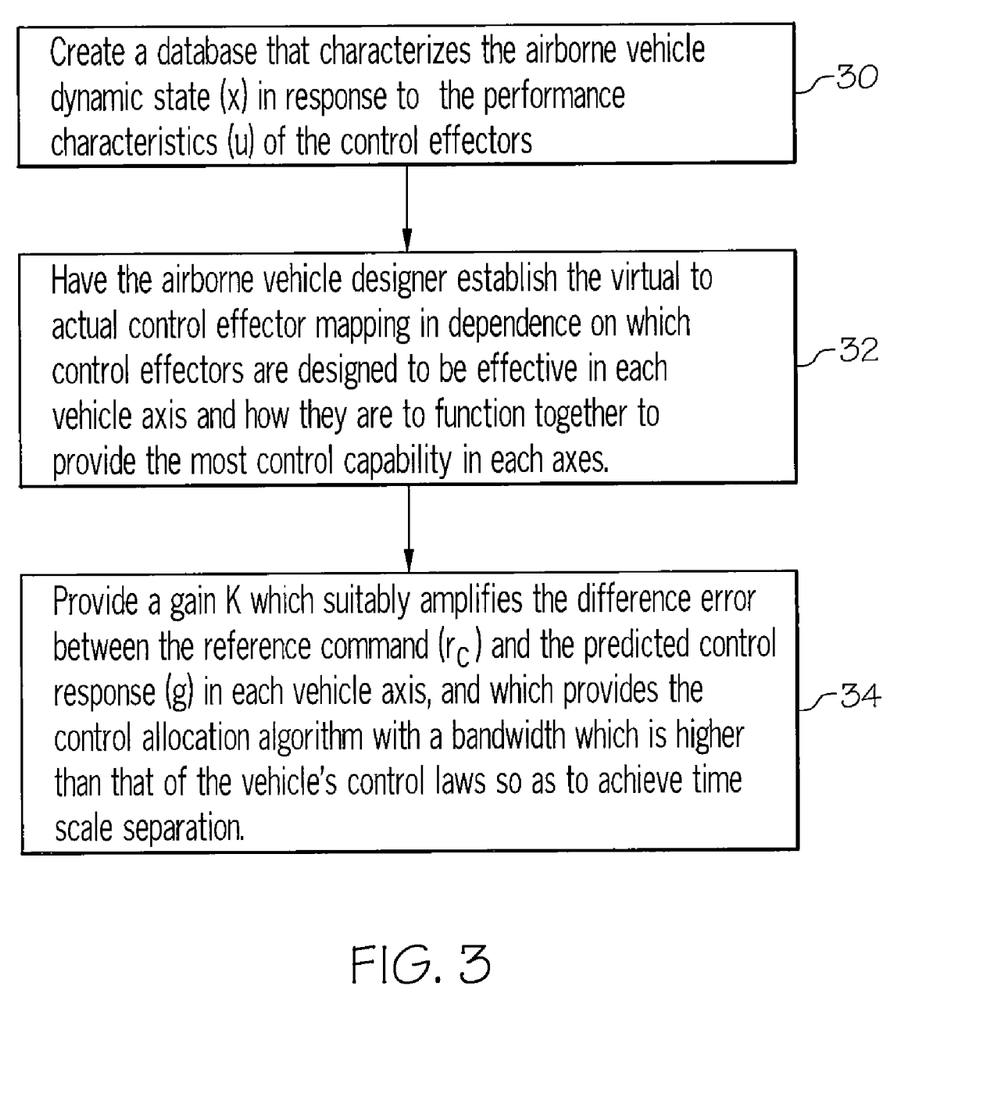
FIG. 3, is a flow chart diagram identifying the major steps of the design method of the present invention.

FIG. 3 is a diagram of the principal steps in formulating a control allocation design according to the present invention. Step 30 creates the $g(x,u)$ transform 20 as a database that characterizes the vehicle dynamics and the various control effectors. This information is derived from wind tunnel testing, computational fluid dynamics, propulsion system testing, etc. that is performed on the vehicle, both during development and after. The resulting database is a function of the vehicle state (x) and the deflection of the various control effectors (u). The forces and moments contributed by a control effector will typically depend on the mach number, angle of attack (AOA) and dynamic pressure of the vehicle (terms included in the vehicle state, x) as well as the deflection of that surface from its neutral position (term included in the vector of control effector deflections, u).

Step 32 requires compilation of The Virtual to Actual Control Effector Mapping 18, which is performed by the vehicle designer. Considerations include which control effectors are effective in each vehicle control axis (e.g. roll, pitch, and yaw), how the effectors should be used together to provide the most control capability in the various axes, and virtual control effector definitions that produce monotonic responses in their respective vehicle control axes. This step may involve evaluation of several options to determine the best option for a given application. The control allocation algorithm provides a method for doing this through the generation of control power maps. A given virtual to actual control effector mapping can be defined and implemented within the control allocation algorithm.

A large magnitude commands may be commanded in a given direction (i.e. combination of commands in each of the vehicle's control axes), and the control allocation algorithm determines the maximum achievable value in that direction. By sweeping this large command vector through different directions, the achievable control sub-space (e.g. combinations of pitch, roll and yaw control that can be simultaneously achieved) is determined. This is most easily visualized in 2 dimensions. For example, holding the pitch axis command at a nominal value and creating a 2 dimensional map of roll and yaw controls that can be produced while also achieving the pitch axis command. The resulting control power maps provide a convenient method for evaluating various options for the virtual to actual control mapping.

The content selection for the Virtual to Actual Control Effector Mapping is also influenced by vehicle operational considerations, and may vary with the vehicle's mission phase. For example, it may be desirable to use a given effector during takeoff and landing to enhance control power and aircraft safety, but it use may be undesirable during cruise conditions due to excessive drag, etc.

The remaining step 34 is to determine the gain K that multiplies the error between the commanded and predicted control response in each axis. The gain selection determines the bandwidth of the corresponding feedback loop in the control allocation method. The gain must be chosen to make the bandwidth of the control allocation algorithm "fast" relative to bandwidth of the aircraft control laws to achieve time scale separation. The gain must also be low enough that the resulting control allocation loop dynamics can be implemented at the selected digital control system sample rate. Furthermore, the designer can limit the gain to keep the 0 dB gain crossover of the control allocation feedback loop below a desired frequency to bound amplification of higher frequency structural modes.

Figure 4:
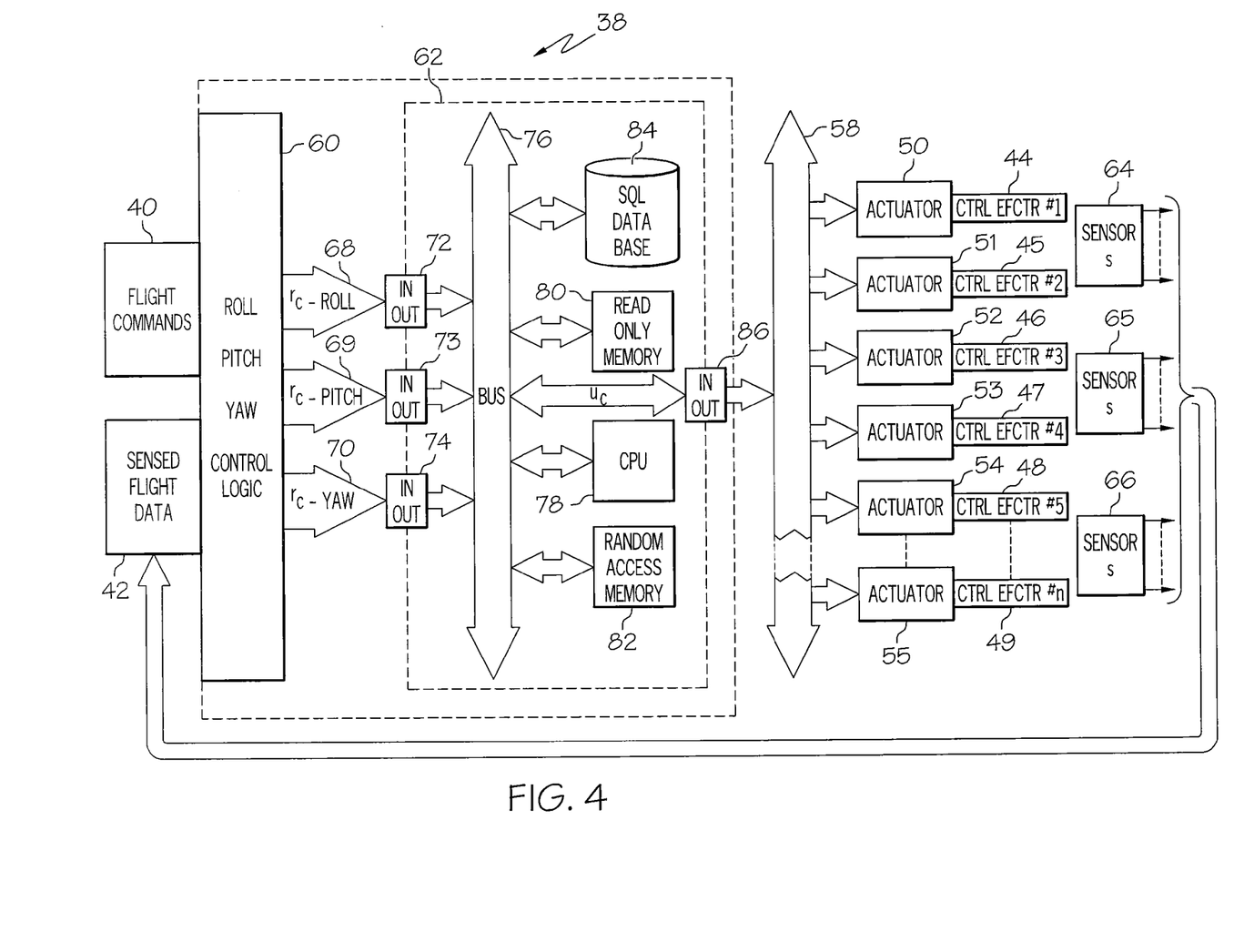
FIG. 4, is a schematic block diagram of a flight control system which embodies the real time control allocation method of the present invention.

Referring now to FIG. 4, which is a schematic block diagram of a digital signal flight control system 38 which embodies the control allocation method of the present invention. The flight control system 38 allocates execution of the reference commands it generates from pilot or auto-pilot flight commands 40 and sensed flight data 42 to the control effectors 44-49 of an aerodynamic vehicle. The control effectors 44-49 are coupled to and controlled by associated actuators 50-55 which position the control effectors in response to the actual control effector command signals ($u_c$) received on bus 58.

The flight control system 38 includes roll, pitch, and yaw control logic circuitry 60 and flight control computer 62. The response of the vehicle to the commanded control effector positions is measured by on board vehicle sensors 64-66 (gyros, accelerometers, etc), and their sensed signals are fed back through the sensed flight data interface 42 to the control logic circuitry 60. The circuitry 60 responds to the flight commands 40 and sensed data 42 within the control laws of the vehicle to control the vehicle rotational rates, angle of attack/angle of sideslip, and/or linear accelerations, by generating moment or rotational acceleration commands in the pitch, roll, and yaw axes on busses 68-70 to the flight control computer 62. The flight control computer 62 receives each of these pitch, roll and yaw commands as reference commands at input/output (I/O) interfaces 72-74, where they are presented to computer bus 76.

The flight control computer includes a central processing unit (CPU) 78, a read only memory (ROM) 80 and a random access memory (RAM) 82. The ROM and RAM memories 80, 82 are adapted to store electronic signals, including electronic program signals which collectively comprise the computer program listings, including the control allocation algorithm of the present invention as functionally represented by the mathematical model 10 of FIG. 1. The CPU 78 performs selected operations on the electronic data signals it receives from bus 76, as specified by the computer program listings stored in ROM 80 and RAM 82 The computer 62 may also include a data memory, such as a structured query language (SQL) data base 84, for storing the K matrix of the g (x, u) nonlinear control power mapping transform and the $\rho(u_c')$ Virtual to Actual Control Effector Mapping, Staging, and Prioritization transform (18, FIG. 1).

As is shown by the mathematical model 10 of FIG. 1, the control allocation algorithm of the present invention employs a feedback tracking loop for each vehicle control axis (i.e. an error signal is computed for each vehicle control axis and is used to adjust the virtual control effector command for that axis). However, this does not require separate instantiations of the algorithm for each vehicle control axis due to the coupling introduced by the Virtual to Actual Control Effector Mapping (18, FIG. 1) and the nonlinear control power mapping function g(x,u). Changing the position of an individual control effector will typically change its contribution to the forces and moments in all vehicle control axes, so that the control allocation algorithm must regulate the errors in all axes simultaneously to work properly. The coupling is also necessary to accommodate axis prioritization when the demands in all vehicle control axes cannot be satisfied simultaneously. The use of a feedback tracking loop in the control allocation scheme also improves robustness to uncertainties in control effector characteristics over traditional control allocation techniques.

The CPU 78 executes the control allocation algorithm to provide the $u_c$ actual control effector command signals at I/O 86. The actual control effector commands in the vector $u_c$ are determined by the control allocation algorithm and are used in predicting what vehicle response will be achieved through the use of the g(x,u) transform (20, FIG. 1). The actual commands are sent on bus 58 to the actuators 50-55, which physically drive the control effectors 44-49 to the commanded positions. The actual commands also drive the predicted response in the vehicle control axes (generated by g(x,u)) to match the reference commands, and the virtual control effector commands are generated by integrating the scaled errors between the reference commands and responses predicted by g(x,u).

In summary, the present method for designing a real time control allocation algorithm based on nonaffine-in-control and nonlinear-in-state uncertain dynamical systems, comprises the following steps.

Analyze the nonlinear function g(x,u) and define virtual control effectors that make the desired control responses in the vehicle control axes (e.g, moments or rotational accelerations) monotonic (i.e, entirely nonincreasing or nondecreasing) with respect to the virtual control effectors. A function is monotonic if its first derivative (which need not be continuous) does not change sign.

Implement the architecture of FIG. 1. The number of "channels" (i.e, integrators and the size the matrix K) will correspond to the number of virtual control effectors.

Analyze the slope of the control responses with respect to their associated virtual control effectors across the operating envelope to determine appropriate magnitude for the elements of the matrix K shown in FIG. 1.

Implement the virtual control effector to actual control effector mapping, including any staged usage of the actual control effectors, as shown in FIG. 1.

Implement integrator limiting to prevent integrator windup, as well as impose axis prioritization and reflect control effector staging, as described in FIG. 1.

Figure 5:
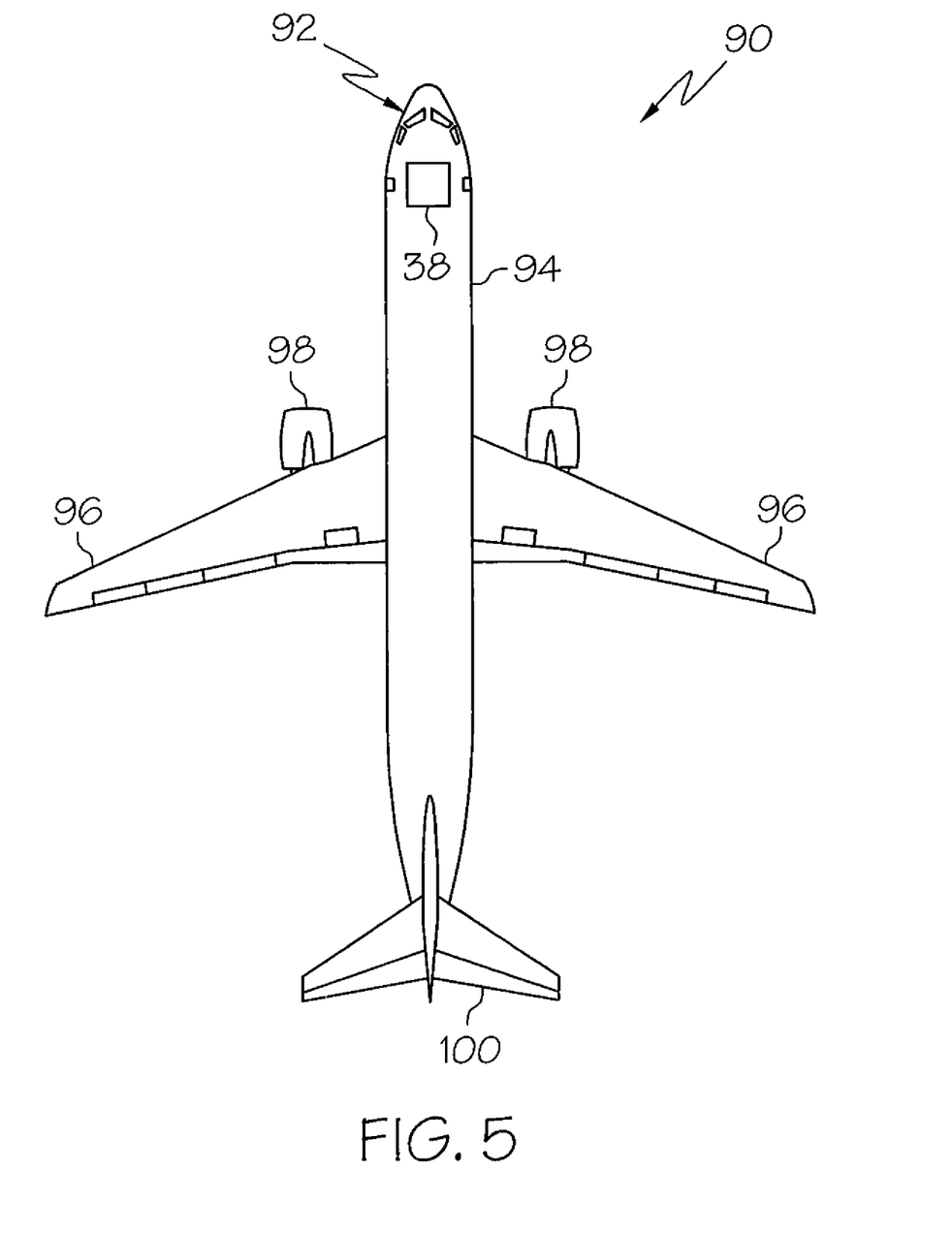
FIG. 5, is an illustration of an aircraft of the type which may be controlled by the flight control system of FIG. 4.

Referring now to FIG. 5, which is an illustration of an aircraft 90 including a flight control system 38 (FIG. 4) which responds to the commands of the pilot in the cockpit 92 to control the flight of the aircraft by generating moment or rotational acceleration reference commands in the pitch, roll, and yaw axes. The flight control system 38 then provides these reference commands to the control allocation algorithm of FIG. 1, to determine the actual control command signals to be provided to the aircraft's control effector actuators. The aircraft 90 also includes a fuselage 94, with wings 96 attached to the fuselage 94 and engines 98 mounted to the wings 96 to provide propulsion. The aircraft 90 additionally includes a tail section 100. The wings 96 and tail section 100 include control effector surface for controlling the flight of the aircraft.

The present invention accommodates dynamic interactions between control effectors, while also employing the nonlinear model of these interactions to accurately accommodate and predict their effects on the vehicle linear and/or angular accelerations. It makes this accommodation through the introduction of virtual control effectors, and the use of the nonlinear transform g(x,u) to predict the control response due to the control effector deflections in each of the vehicle control axes. The virtual control effectors have the added advantage of ensuring that the control effectors are used in a logical way, which is not guaranteed by iterative search techniques that work directly with the individual control effectors.

The present control allocation method adapts to detected control effector failures by simply freezing the position of the failed control effector when used in the evaluation of the g(x,u) function. The feedback tracking loops will drive the virtual control effector commands and track the reference inputs as long as control power is available. The use of feedback control rather than the traditional direct inversion technique of the prior art makes this control allocation method more robust to uncertainties in control effector characteristics. This invention simply embeds the nonlinear control effectiveness function rather than trying to invert it, and thus is much simpler to mechanize.

Since the present control allocation method does not require iterative solution techniques, it is highly suitable for real time applications. Similarly, the method band limits the gain of the control allocation algorithm to ease structural mode interaction issues. Direct inversion techniques yield a constant gain across all frequencies and thus can amplify structural modes when control effectiveness is low.

The design method of the present invention significantly reduces flight control system development costs associated with control allocation algorithms. It provides a formal and numerically efficient method to rapidly and accurately assess vehicle control power relative to maneuvering requirements during configuration development, and provides robust performance to uncertainties in control power characteristics and control effector failures.

The flowcharts and block diagrams in the Drawing Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," and "includes" and/or "including" when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for providing actual control effector command signals which allocate real time control authority among the control effectors of a vehicle for the execution of commanded maneuvers that are received as reference command signals which identify the control actions to be performed and the vehicle control axes in which those actions must be performed to enable vehicle execution of the commanded maneuver, the actual control effector command signal allocating control authority among those vehicle control effectors capable of producing the necessary control actions in the required vehicle control axes in satisfaction of the reference command signal, with consideration given in such control allocation to at least one of the possible nonlinear and non-monotonic effects each of the performing control effectors may have on the vehicle and on each other, the method comprising:

apportioning the reference command signals among a suite of virtual control effectors having control authority to perform the commanded maneuvers, such apportions being identified as virtual control effector signals which command performance of their assigned portion of the reference command signal by their associated virtual control effector, such suite of virtual control effectors being present in such number as necessary to accommodate apportionment of all control actions as may be required by the reference command signals in pre-selected vehicle control axes;

mapping the performance commanded of each of the virtual control effectors by their associated virtual control effector command signals, into actual control effector command signals which actuate those of the vehicle control effectors as are identified as capable, individually or in combination, of performance which achieves the control actions required by the reference command signal, wherein mapping comprises prioritizing the actuation of those vehicle control effectors elected for performance of the control actions to achieve the control actions required by the reference command signal in each of the vehicle control axes when the reference command signal in each of the vehicle control axes cannot be satisfied simultaneously; and modifying the virtual control effector signals using a stable feedback loop which accommodates for at least one of such nonlinear and non-monotonic performance effects as are predicted, in response to the present control effector command signals, to occur on the vehicle or on the vehicle control effectors.

2. The method of claim 1, wherein the step of modifying comprises:

presenting the actual control effector command signals obtained from the step of mapping to a possibly nonlinear control power transform $g(x,u)$ that maps vehicle states and each actual control effector command signal to the predicted response dynamics of the vehicle to the vehicle control effector response to the actual control effector command signal, including such nonlinear and non-monotonic response dynamics as may be present therein, and obtaining therefrom the predicted response dynamics to the present actual control effector command signal; and altering, in a stable feedback loop, the virtual control effector command signals in a manner which minimizes the difference signal magnitude between the predicted response dynamics provided by the $g(x,u)$ transform and those commanded by the received reference command signals.

3. The method of claim 2, wherein the step of altering comprises:

subtracting the predicted response dynamics of the $g(x,u)$ transform from the received reference command signals, as provided in a tracking feedback loop, to determine a difference signal error there between; and integrating the difference signal error using a proportional gain integrator to adjust the virtual control effector command signals in a manner which minimizes the difference signal magnitude between the predicted and the achieved response dynamics of the vehicle.

4. The method of claim 3, wherein the gain of the proportional gain integrator is selected to provide the tracking feedback loop with a bandwidth which minimizes amplification of the high frequency dynamics associated with structural modes of the aircraft and, at the same time, achieves time-scale separation between the vehicle and the integrator dynamics.

5. The method of claim 1, wherein the step of mapping includes:

electing for actuation those vehicle control effectors capable, individually or in combination, of performance which achieves the control actions required by the reference command signal, as indicated by the virtual control effector signals.

6. The method of claim 1, wherein the step of mapping further includes staging the actuation of those vehicle control effectors elected for performance of the required control action in succeeding stages, from a first stage actuation of the minimum number of control effectors required, to a last stage maximum number of control effectors, as necessary to achieve the control actions required by the reference command signal.

7. A computer program product for allocating real time control authority among the control effectors of a vehicle in execution of commanded vehicle maneuvers, the computer program product comprising:

a non-transitory computer usable medium having computer usable program code embodied therewith, the non-transitory computer usable medium comprising:

computer usable program code configured to process received reference command signals that identify the vehicle actions to be performed and the vehicle control axes in which those actions must be performed to enable vehicle execution of the commanded maneuver, and to provide actual control effector command signals that allocate control authority among those vehicle control effectors capable of producing the necessary control actions in the required vehicle control axes in satisfaction of the reference command signal, with consideration given in such control allocation to the at least one of possible nonlinear and non-monotonic effects each of the performing control effectors may have on the vehicle and on each other, and wherein the computer usable program code configured to process received reference command signals and to provide actual control effector command signals comprises:

computer usable program code configured to apportion the reference command signals among a suite of virtual control effectors having control authority to perform the commanded maneuvers, such apportions being identified as virtual control effector signals which command performance of their assigned portion of the reference command signal by their associated virtual control effector, such suite of virtual control effectors being present in such number as necessary to accommodate apportionment of all control actions as may be required by the reference command signals in pre-selected vehicle control axes;

computer usable program code configured to map the performances commanded of each of the virtual control effectors by their associated virtual control effector command signals, into actual control effector command signals which actuate those of the vehicle control effectors as are identified as capable, individually or in combination, of performance which achieves the control actions required by the reference command signal;

computer usable program code configured to prioritize the actuation of those vehicle control effectors elected for performance of the control actions to achieve the control actions required by the reference command signal in each of the vehicle control axes when the reference command signal in each of the vehicle control axes cannot be satisfied simultaneously; and computer usable program code configured to modify the virtual control effector signals using a stable feedback loop which accommodates for at least one of such non-linear and non-monotonic performance effects as are predicted, in response to the present actual control effector command signals, to occur on the vehicle or on the vehicle control effectors.

8. The computer program product of claim 7, further comprising:

computer usable program code configured to present, in execution of the modification of the virtual control effector signal, the actual control effector command signals obtained from mapping the virtual commands, to a possibly nonlinear control power transform $g(x,u)$ that maps vehicle states and each actual control effector command signal to the predicted response dynamics of the vehicle to the vehicle control effector response to the actual control effector command signal, including such nonlinear and non-monotonic response dynamics as may be present therein, and obtaining therefrom the predicted response dynamics to the present actual control effector command signal; and computer usable program code configured to alter, in a stable feedback loop manner, the virtual control effector command signals to minimize the difference signal magnitude between the predicted response dynamics provided by the $g(x,u)$ transform and those commanded by the received reference command signals.

9. The computer program product of claim 8, further comprising computer usable program code configured to subtract the predicted response dynamics of the $g(x,u)$ transform from the received reference command signals, as provided in a tracking feedback loop, to determine a difference signal error there between; and integrating the difference signal error using a proportional gain integrator to adjust the virtual control effector command signals in a manner which minimizes the difference signal magnitude between the predicted and the achieved response dynamics of the vehicle.

10. The computer program product of claim 9, further comprising computer usable program code configured to alter the gain of the proportional gain integrator as necessary to provide the tracking feedback loop with a bandwidth which minimizes amplification of the high frequency dynamics associated with structural modes of the aircraft and, at the same time, achieves time-scale separation between the vehicle and integrator dynamics.

11. The computer program product of claim 8, further comprising computer usable program code configured to elect for actuation those vehicle control effectors capable, individually or in combination, of performance which achieves the control actions required by the reference command signal, as indicated by the virtual control effector signals.

12. The computer program product of claim 7, further comprising computer usable program code configured to stage the actuation of those vehicle control effectors elected for performance of the required control action in succeeding stages, from a first stage actuation of the minimum number of control effectors required to a last stage maximum number of control effectors, as necessary to achieve the control actions required by the reference command signal.

13. A vehicle control system for allocating real time control authority for the execution of commanded vehicle maneuvers among the vehicle's control effectors, comprising:
control logic means, responsive jointly to sensed data representative of the vehicle's dynamic response to commanded vehicle maneuvers, and to commanded vehicle maneuvers from the vehicle operator, the control logic means formulating, within the control laws of the vehicle, reference command signals which specify the control actions to be performed in each of the vehicle's control axes for vehicle execution of the commanded maneuver, and
control computer means, responsive to the reference command signals from the control logic means, and having signal processing means for executing program signals, and memory means for storing program signals, including control allocation algorithm program signals, the control computer means, in executing the control allocation algorithm program signals, performs steps comprising:
apportioning the reference command signals among a suite of virtual control effectors having control authority to perform the commanded maneuvers, such apportions being identified as virtual control effector signals which command performance of their assigned portion of the reference command signal by their associated virtual control effector, such suite of virtual control effectors being present in such number as necessary to accommodate apportionment of all control actions as may be required by the reference command signals in pre-selected vehicle control axes;
mapping the performances commanded of each of the virtual control effectors by their associated virtual control effector command signals, into actual control effector command signals which actuate those of the vehicle control effectors as are identified as capable, individually or in combination, of performance which achieves the control actions required by the reference command signal;
prioritizing the actuation of those vehicle control effectors elected for performance of the control actions to achieve the control actions required by the reference command signal in each of the vehicle control axes when the reference command signal in each of the vehicle control axes cannot be satisfied simultaneously; and
modifying the virtual control effector signals using a stable feedback loop which accommodates for at least one of such nonlinear and non-monotonic performance effects as are predicted, in response to the present control effector command signals, to occur on the vehicle or on the vehicle control effectors.

14. The vehicle control system of claim 13, wherein the control computer means, in execution of the control allocation algorithm program signals, further performs the steps of:
presenting the actual control effector command signals obtained from the step of mapping, to a nonlinear control power transform g(x,u) that maps vehicle states and each actual control effector command signal to the predicted response dynamics of the vehicle to the vehicle control effector response to the actual control effector command signal, including such nonlinear and non-monotonic response dynamics as may be present therein, and obtaining therefrom the predicted response dynamics to the present actual control effector command signal; and
altering, in a stable feedback loop, the virtual control effector command signals in a manner which minimizes the difference signal magnitude between the predicted response dynamics provided by the g(x,u) transform and those commanded by the received reference command signals.

15. The vehicle control system of claim 14, wherein the control computer means, in execution of the control allocation algorithm program signals, further performs the steps of:
subtracting the predicted response dynamics of the g(x,u) transform from the received reference command signals, as provided in a tracking feedback loop, to determine a difference signal error there between; and
integrating the difference signal error using a proportional gain integrator to adjust the virtual control effector command signals in a manner which minimizes the difference signal magnitude between the predicted and the achieved response dynamics of the vehicle.

16. The vehicle control system of claim 15, wherein the control computer means, in execution of the control allocation algorithm program signals, further performs the steps of:
setting the gain of the proportional gain integrator to a value which provides the tracking feedback loop with a bandwidth that minimizes amplification of the high frequency dynamics associated with structural modes of the aircraft and, at the same time, achieves time-scale separation between the vehicle and the integrator dynamics.

17. The vehicle control system of claim 13, wherein the control computer means, in execution of the control allocation algorithm program signals, further performs the steps of:
electing for actuation those vehicle control effectors capable, individually or in combination, of performance which achieves the control actions required by the reference command signal, as indicated by the virtual control effector signals.

18. The vehicle control system of claim 13, wherein the control computer means, in execution of the control allocation algorithm program signals, further performs the steps of:
staging the actuation of those vehicle control effectors elected for performance of the required control action in succeeding stages, from a first stage actuation of the minimum number of control effectors required to a last stage maximum number of control effectors, as necessary to achieve the control actions required by the reference command signal.

19. An aircraft, comprising:
a fuselage and wings attached to the fuselage;
a cockpit in the fuselage if the aircraft is piloted; and
a vehicle control system, in the fuselage, for allocating real time control authority for the execution of commanded vehicle maneuvers among the vehicle's control effectors, the vehicle control system comprising:
control logic means, responsive jointly to sensed data representative of the vehicle's dynamic response to commanded vehicle maneuvers, and to commanded vehicle maneuvers from the vehicle operator, the control logic means formulating, within the control laws of the vehicle, reference command signals which specify the control actions to be performed in each of the vehicle's control axes for vehicle execution of the commanded maneuver, and control computer means, responsive to the reference command signals from the control logic means, and having signal processing means for executing program signals, and memory means for storing program signals, including control allocation algorithm program signals, the control computer means, in executing the control allocation algorithm program signals, performs steps comprising:

apportioning the reference command signals among a suite of virtual control effectors having control authority to perform the commanded maneuvers, such apportions being identified as virtual control effector signals which command performance of their assigned portion of the reference command signal by their associated virtual control effector, such suite of virtual control effectors being present in such number as necessary to accommodate apportionment of all control actions as may be required by the reference command signals in pre-selected vehicle control axes;

mapping the performances commanded of each of the virtual control effectors by their associated virtual control effector command signals, into actual control effector command signals which actuate those of the vehicle control effectors as are identified as capable, individually or in combination, of performance which achieves the control actions required by the reference command signal;

prioritizing the actuation of those vehicle control effectors elected for performance of the control actions to achieve the control actions required by the reference command signal in each of the vehicle control axes when the reference command signal in each of the vehicle control axes cannot be satisfied simultaneously; and modifying the virtual control effector signals using a stable feedback loop which accommodates for at least one of such nonlinear and non-monotonic performance effects as are predicted, in response to the present control effector command signals, to occur on the vehicle or on the vehicle control effectors.

20. The aircraft of claim 19, wherein the vehicle control system control computer means, in execution of the control allocation algorithm program signals, further performs the steps of:

presenting the actual control effector command signals obtained from the step of mapping, to a possibly nonlinear control power transform $g(x,u)$ that maps vehicle states and each actual control effector command signal to the predicted response dynamics of the vehicle to the vehicle control effector response to the actual control effector command signal, including such nonlinear and non-monotonic response dynamics as may be present therein, and obtaining therefrom the predicted response dynamics to the present actual control effector command signal; and altering, in a stable feedback loop, the virtual control effector command signals in a manner which minimizes the difference signal magnitude between the predicted response dynamics provided by the $g(x,u)$ transform and those commanded by the received reference command signals.

21. The aircraft of claim 20, wherein the vehicle control system control computer means, in execution of the control allocation algorithm program signals, further performs the steps of:

subtracting the predicted response dynamics of the $g(x,u)$ transform from the received reference command signals, as provided in a tracking feedback loop, to determine a difference signal error there between; and integrating the difference signal error using a proportional gain integrator to adjust the virtual control effector command signals in a manner which minimizes the difference signal magnitude between the predicted and the achieved response dynamics of the vehicle.

22. The aircraft of claim 21, wherein the vehicle control system control computer means, in execution of the control allocation algorithm program signals, further performs the steps of:

setting the gain of the proportional gain integrator to provide the tracking feedback loop with a bandwidth which minimizes amplification of the high frequency dynamics associated with structural modes of the aircraft and, at the same time, achieves time-scale separation between the vehicle and the integrator dynamics.

23. The aircraft of claim 20, wherein the vehicle control system control computer means, in execution of the control allocation algorithm program signals, further performs the steps of:

electing for actuation those vehicle control effectors capable, individually or in combination, of performance which achieves the control actions required by the reference command signal, as indicated by the virtual control effector signals.

24. The aircraft of claim 23, wherein the vehicle control system control computer means, in execution of the control allocation algorithm program signals, further performs the steps of:

staging the actuation of those vehicle control effectors elected for performance of the required control action in succeeding stages, from a first stage actuation of the minimum number of control effectors required to a last stage maximum number of control effectors, as necessary to achieve the control actions required by the reference command signal.

* * * * *